(12) United States Patent
Gruber et al.

(10) Patent No.: US 7,968,077 B2
(45) Date of Patent: Jun. 28, 2011

(54) METHOD FOR MANUFACTURING TITANIUM DIOXIDE BY OXIDIZING OF TITANIUM TETRACHLORIDE

(75) Inventors: Rainer Gruber, Leverkusen (DE); Frank Malcharek, Köln (DE)

(73) Assignee: Kronos International, Inc., Leverkusen (DE)

( * ) Notice: Subject to any disclaimer, the term of this patent is extended or adjusted under 35 U.S.C. 154(b) by 247 days.

(21) Appl. No.: 11/942,053

(22) Filed: Nov. 19, 2007

(65) Prior Publication Data

US 2008/0152582 A1  Jun. 26, 2008

Related U.S. Application Data

(60) Provisional application No. 60/871,293, filed on Dec. 21, 2006.

(30) Foreign Application Priority Data

Dec. 20, 2006 (DE) .......................... 10 2006 060 988
Oct. 9, 2007 (DE) .......................... 10 2007 048 553

(51) Int. Cl.
*C01G 23/047* (2006.01)

(52) U.S. Cl. .......................................... 423/613; 423/69

(58) Field of Classification Search .................. 423/613, 423/69, 592.1, 610
See application file for complete search history.

(56) References Cited

U.S. PATENT DOCUMENTS

| | | | |
|---|---|---|---|
| 2,721,626 A | 10/1955 | Rick | |
| 3,022,137 A * | 2/1962 | Nelson | 423/613 |
| 3,069,282 A * | 12/1962 | Allen | 106/437 |
| 3,148,027 A | 9/1964 | Richmond | |
| 3,306,760 A | 2/1967 | Zirngibl et al. | |
| 3,485,584 A | 12/1969 | Zirngibl et al. | |
| 3,532,462 A | 10/1970 | Zirngibl et al. | |
| 3,650,694 A * | 3/1972 | Allen | 423/613 |
| 3,663,283 A | 5/1972 | Hebert et al. | |
| 3,725,526 A * | 4/1973 | Pieri et al. | 423/613 |
| 3,735,000 A | 5/1973 | Calcagno et al. | |
| 4,145,403 A * | 3/1979 | Fey et al. | 423/613 |
| 6,419,893 B1 | 7/2002 | Yuill et al. | |
| 2002/0155059 A1 | 10/2002 | Boulos et al. | |
| 2006/0133989 A1 | 6/2006 | Sarracini et al. | |
| 2008/0003152 A1 * | 1/2008 | Fait et al. | 423/69 |

FOREIGN PATENT DOCUMENTS

| | | |
|---|---|---|
| DE | 974793 | 4/1961 |
| DE | 1177114 | 9/1964 |
| DE | 1592530 | 9/1967 |
| DE | 1259851 | 2/1968 |
| DE | 2037990 | 7/1970 |
| GB | 1217594 | 12/1970 |

* cited by examiner

*Primary Examiner* — Stuart Hendrickson
*Assistant Examiner* — Richard M Rump
(74) *Attorney, Agent, or Firm* — Locke Lord Bissell & Liddell LLP

(57) ABSTRACT

A method for manufacturing titanium dioxide by reacting titanium tetrachloride with an oxygen-bearing gas in a tubular reactor and subsequently cooling the titanium dioxide particle/gas mixture in a cooling section, where the gas/particle flow is caused to rotate. Titanium tetrachloride is introduced in the cross-sectional plane of the reactor, but not in the radial direction, whereby the flow velocity of the oxygen-bearing gas is more than 20 m/s. Scrub solids free the inner wall of the reactor and the reactor cooling section of $TiO_2$ deposits, thereby achieving a better cooling performance, which produces a $TiO_2$ pigment with a narrow particle size distribution.

9 Claims, 1 Drawing Sheet

METHOD FOR MANUFACTURING TITANIUM DIOXIDE BY OXIDIZING OF TITANIUM TETRACHLORIDE

RELATED APPLICATIONS

This application claims the benefit of U.S. Provisional Patent Application Ser. No. 60/871,293 filed Dec. 21, 2006 and the benefit of DE 2006 060 988.3 filed Dec. 20, 2006 and DE 2007 048 553.2 filed Oct. 8, 2007.

FIELD OF THE INVENTION

The invention relates to a method for manufacturing titanium dioxide by oxidizing of titanium tetrachloride and subsequently cooling the titanium dioxide particle/gas mixture in a cooling section, where the gas/particle flow is caused to rotate.

BACKGROUND OF THE INVENTION

A commercial method for manufacturing titanium dioxide pigment, known as the chloride process, is based on titanium tetrachloride ($TiCl_4$) being converted into titanium dioxide and chlorine gas in a tubular reactor using a preheated, oxidizing gas, such as oxygen, air, etc., and certain additives. The oxidation reaction is highly exothermic, meaning that the reaction mixture displays temperatures of more than 1,500° C. following complete conversion. In a downstream reactor cooling section, the $TiO_2$ pigment particles formed are cooled to below roughly 400° C. and separated from the gas flow. Cooling directly after the completion of particle formation must take place rapidly in order to prevent further particle growth. To this end, the tubular reactor or the reactor cooling section is externally cooled with water from this point onwards.

However, the transfer of heat to the cooling water is severely impeded by the accumulation of $TiO_2$ pigment particles on the inner wall of the tubular reactor or the reactor cooling section. According to U.S. Pat. No. 2,721,626, scrub solids are introduced into the reactor cooling section for detaching pigment particles that have accumulated on the inner walls. The scrub solids used in U.S. Pat. No. 2,721,626 are abrasive particles, such as quartz sand or aggregated $TiO_2$ particles with particle sizes of roughly 0.15 mm to 6.35 mm. The scrub solids are introduced into the $TiO_2$/gas suspension at one or more points in the reactor cooling section.

Because of their weight, the scrub solids begin to concentrate in the lower one-third of the reactor tube circumference in the horizontal reactor cooling section just a short time after being added. While this area of the inner wall is thoroughly cleaned of adhering pigment, the higher areas of the circumference are insufficiently cleaned, and the cooling of the gas suspension is inadequate. Nevertheless to achieve sufficient heat transfer, it is standard practice to substantially increase the amount of scrub solids added. The added solids increase the burden on the system for manufacturing, adding and eliminating the scrub solids, thus giving rise to higher costs for energy consumption and maintenance, among other things.

U.S. Pat. No. 6,419,893 B1 describes a method for more efficient removal of the $TiO_2$ deposits on the inner wall of the reactor cooling section. According to U.S. Pat. No. 6,419,893 B1, at least a partial area of the reactor cooling section is provided with ribs that run in helical fashion on the inner wall and serve as guide elements, as a result of which the scrub solids are guided through the cooling section in a helical flow. The ribs are arranged at an angle of 2° to 6°.

US 2006/0133989 A1 discloses a reactor cooling section of helical overall design that is said to achieve improved cleaning of the inner wall by the scrub solids.

U.S. Pat. No. 3,735,000 discloses a method for manufacturing titanium dioxide by reaction in the gas phase, where part of the gaseous reaction components is introduced tangentially into the reactor. This method is designed, to reduce the formation of deposits on the reactor walls by tangential introduction of one reaction component while achieving rapid thorough mixing of the reaction components by generating a back flow. The back flow is further intensified by the cross-section of the reactor expanding conically in the direction of flow. However, back flow leads to residence times of different length for the individual particles in the reactor.

A narrow particle size distribution is important for the quality of a titanium dioxide pigment, particularly for the tinting strength (TS). However, for generating a narrow particle size distribution, not rapid thorough mixing of the reaction components is of primary importance, but a narrow residence time distribution of the $TiO_2$ particles in the reactor, meaning that any kind of back flow in the reactor should be avoided.

SUMMARY OF THE INVENTION

The present method frees the inner wall of the tubular reactor and the reactor cooling section of $TiO_2$ deposits with the help of scrub solids, thereby achieving a better cooling performance, while producing a $TiO_2$ pigment with a narrow particle size distribution.

The present method for manufacturing titanium dioxide particles in a cylindrical tubular reactor by reacting titanium tetrachloride and an axially introduced, oxygen-bearing gas and subsequently cooling the particles, provides for introducing the titanium tetrachloride into the tubular reactor in the cross-sectional plane of the tubular reactor, but not in the radial direction, and whereby the flow velocity of the oxygen-bearing gas is more than 20 m/s, particularly at least 40 m/s.

BRIEF DESCRIPTION OF THE DRAWINGS

For a more complete understanding of the present invention and for further advantages thereof, reference is now made to the following description taken in conjunction with the accompanying drawings in which.

DESCRIPTION OF THE PREFERRED EMBODIMENTS

Figure 1:
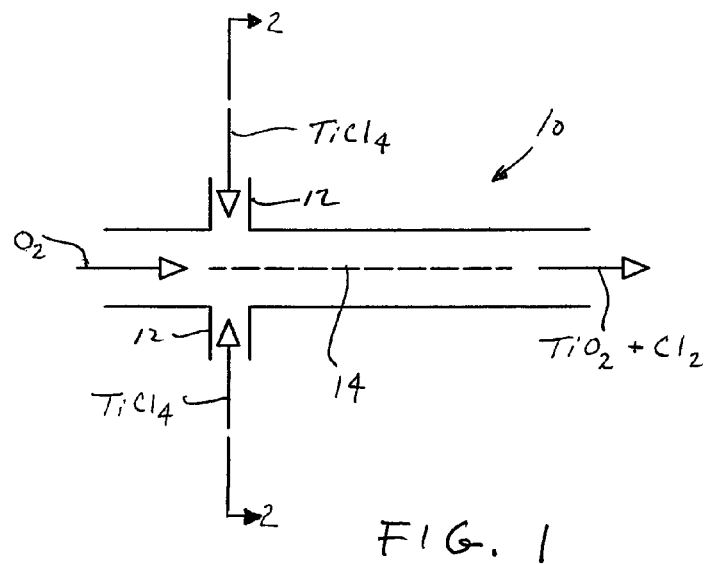
FIG. 1 is a schematic side view of a tubular reactor for use with the present method.

As used herein, the term "tubular reactor" is defined as the part of the reactor in which the $TiCl_4$ oxidation reaction and $TiO_2$ particle formation takes place (See FIG. 1 element 10). The reactor cooling section is defined as the downstream part of the tubular reactor, where the reaction is arrested by rapid cooling and the gas suspension is further cooled. Various additives and gases, such as aluminum chloride, chlorine, nitrogen, alkali salts, etc., are customarily introduced into the reactor together with the $TiCl_4$. The term "$TiCl_4$" is defined to mean the oxygen-free flow consisting essentially of TiCl$_4$. The term "O$_2$" is defined to mean the oxygen-bearing gas flow.

The present invention is based on the knowledge that a major part of the heat is dissipated at the start of the reactor cooling section, where the high temperature of the TiO$_2$/gas suspension generates a high, driving temperature gradient towards the inner wall of the reactor tube. The abrasive action of the scrub solids in this area can be substantially improved by causing the scrub solids flow, or the entire flow, to rotate. This rotation and centrifugal force distribute the scrub solids over the entire circumference of the tube, simultaneously pressing them against the wall, as a result of which the latter is cleaned uniformly and intensively.

Figure 2:
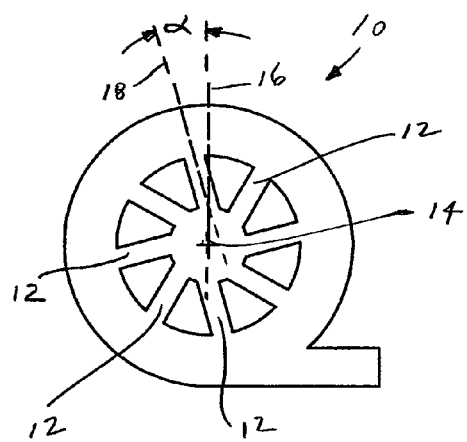
FIG. 2 is a cross-sectional view taken generally along sectional lines 2-2 of FIG. 1.
Figure 3:
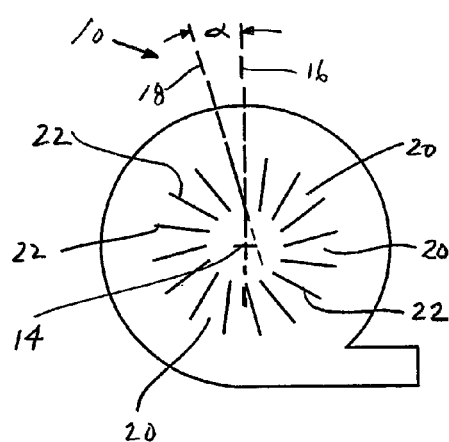
FIG. 3 is a cross-sectional view taken generally along sectional lines 2-2 of FIG. 1 of an alternate embodiment of a tubular reactor for use with the present method.

Referring to FIGS. 1-3, the TiCl$_4$ is preferably introduced into the reactor 10, through nozzles 12 which include for example, all kinds of feed lines, such as ducts, pipes, etc., and all kinds of nozzles, such as Venturi tubes or Laval nozzles. The nozzles 12 can be distributed over the circumference of the reactor 10 in a common axial position as shown in FIG. 2. Reactor 10 is cylindrical structure and includes a longitudinal axis 14. O$_2$ is introduced into reactor 10 in the direction of axis 14. TiCl$_4$ is introduced into reactor 10 through nozzles 12 in a tangential direction, but not along the radius of reactor 10. FIG. 2 illustrates a cross-sectional plane of reactor 10 having a radius shown by line 16. TiCl$_4$ is introduced into reactor 10 along a path shown by line 18 which is offset from radius 16 by angle α. Alternatively, the nozzles can also be axially offset relative to each other.

In a further embodiment of the present invention, the TiCl$_4$ can also be introduced into the reactor 10 through a slit-like opening 20. In this embodiment, the tangential direction of the TiCl$_4$ flow is brought about by baffle plates 22 in the slit-like opening 20 that are set at a corresponding angle α as shown in FIG. 3.

According to the present invention, the entire flow-reaction mixture and scrub solids—is caused to rotate in the tubular reactor 10 and the reactor cooling section by introducing the added titanium tetrachloride into the tubular reactor 10 tangentially. Owing to its high specific weight, the TiCl$_4$ introduces substantial tangential momentum into the flow, this being sufficient to generate lasting rotation.

Tangential introduction of the TiCl$_4$ into the tubular reactor 10 means that introduction takes place in the cross-sectional plane of the tubular reactor 10, but at an angle α of >0° to <90°, preferably 1° to 15°, and particularly 5° to 10°, relative to the radial direction, (see FIGS. 2 and 3).

Back flow in the reactor 10 can be largely avoided in the method according to the present invention, and a uniform residence time thus achieved for all TiO$_2$ particles in the reactor. In contrast to the teaching in U.S. Pat. No. 3,735,000, the present result is achieved by the axially introduced O$_2$ flow having a flow velocity of more than 20 m/s, particularly, for example, at least 40 m/s, and the tubular reactor 10 having a cylindrical form. The momentum ratio (ratio of the products of flow velocity and specific weight) of the tangentially introduced reaction component (TiCl$_4$) to the axially introduced gaseous component (O$_2$) is in excess of 100.

The improvement of heat transfer to the wall of the cooling section, achieved by introducing the TiCl$_4$ in accordance with the present invention, can be further improved if the scrub solids are extensively scattered when introduced into the tubular reactor 10, this bringing about uniform distribution of the scrub solids and, accordingly, uniform cleaning of the reactor wall. This scattering can be achieved by causing the flow of scrub solids to rotate strongly prior to being introduced into the reactor. This rotation can, for example, be achieved by designing the feed port in a form similar to a cyclone, into which the scrub solids flow is introduced tangentially by means of pneumatic conveying.

Compared to the methods according to U.S. Pat. No. 6,419,893 B1 and US 2006/0133989 A1, the present invention is characterised in that the entire flow is caused to rotate, and cleaning of the inner wall and cooling of the gas suspension are thus optimised. Moreover, no complex design measures downstream of the point of TiCl$_4$ introduction are necessary, such as wear-susceptible internal fixtures or a helical design of the entire reactor cooling section. Compared to the method according to U.S. Pat. No. 3,735,000 the present invention is furthermore characterised in that, despite the high tangential momentum of the TiCl$_4$ flow, back flow is largely avoided and TiO$_2$ pigment particles with a narrow particle size distribution, and thus improved tinting strength (TS), can be manufactured.

EXAMPLE

An example of the present invention is explained below, without this being intended as a limitation. 12 t/h TiCl$_4$ are introduced into a tubular reactor with an inside diameter of approx. 0.3 m by means of 10 circular nozzles, and caused to react with preheated oxygen-bearing gas. The nozzles are located at a common axial position on the tubular reactor and distributed evenly over the circumference. All nozzles are set tangentially in the same direction in the cross-sectional plane, in such a way that they deviate from the radial direction by 6°. Compared to a purely radial layout of the nozzles, this configuration reduces the scrub solids requirement from roughly 2.0 to 1.2 t/h.

The invention claimed is:

1. A method for manufacturing titanium dioxide particles in a horizontal cylindrical tubular reactor having a longitudinal axis and having a downstream cooling section directly connected to said reactor, by reacting titanium tetrachloride and oxygen-bearing gas and subsequently cooling the particles in the downstream cooling section and separating the particles from the gas flow, comprising:
   introducing the oxygen-bearing gas into the tubular reactor in the direction of the longitudinal axis of the tubular reactor;
   introducing the titanium tetrachloride into the tubular reactor in a cross-sectional plane of the tubular reactor at an angle offset of more than 1° and less than 90° from a direct radial direction to the axis of the tubular reactor to generate a rotating gas stream;
   introducing scrub solids into the tubular reactor;
   whereby the rotating gas stream creates a rotational flow substantially free of backflow and that rotates the scrub solids sufficiently to reduce the amount of scrub solids required to prevent the formation of substantial deposits on the tubular reactor; and
   whereby the flow velocity of the oxygen-bearing gas is more than about 20 m/s.

2. The method of claim 1, whereby the flow velocity of the oxygen-bearing gas is at least about 40 m/s.

3. The method of claim 1, whereby the offset angle the titanium tetrachloride is introduced into the reactor at is greater than about 1° and less than about 15°.

4. The method of claim 1, whereby the offset angle the titanium tetrachloride is introduced into the reactor at is greater than about 5° and less than about 10°.

5. The method of claim 1, whereby the titanium tetrachloride is introduced into the reactor using a plurality of nozzles.

6. The method of claim 5, whereby the plurality of nozzles are axially offset relative to each other.

7. The method of claim 1, whereby the titanium tetrachloride is introduced into the reactor through slit-like opening baffle plates offset from the radial direction.

8. The method of claim 1, and further including:
introducing a flow of scrub solids into a cooling section of the reactor whereby the scrub solids flow is caused to rotate strongly prior to being introduced into the reactor.

9. The method of claim 1, whereby the product of flow velocity and specific weight of the titanium tetrachloride flow is at least about 100 times the product of flow velocity and specific weight of the oxygen-bearing gas flow.

* * * * *